United States Patent
Zhang et al.

(10) Patent No.: US 10,114,621 B2
(45) Date of Patent: Oct. 30, 2018

(54) METHODS AND APPARATUS TO GENERATE A WIZARD APPLICATION

(75) Inventors: Han Zhang, Shanghai (CN); Nai-Long Wen, Shanghai (CN); Ping Wang, Shanghai (CN)

(73) Assignee: ENTIT SOFTWARE LLC, Sunnyvale, CA (US)

( * ) Notice: Subject to any disclaimer, the term of this patent is extended or adjusted under 35 U.S.C. 154(b) by 922 days.

(21) Appl. No.: 13/004,743

(22) Filed: Jan. 11, 2011

(65) Prior Publication Data

US 2012/0179986 A1   Jul. 12, 2012

(51) Int. Cl.
*G06F 3/00* (2006.01)
*G06F 8/38* (2018.01)
*G06F 9/451* (2018.01)

(52) U.S. Cl.
CPC .............. *G06F 8/38* (2013.01); *G06F 9/453* (2018.02)

(58) Field of Classification Search
CPC .............. G06F 3/0481; G06F 17/3089; G06F 17/30893; G06F 8/34; G06F 3/038; G06F 8/30
USPC ............................................... 715/762
See application file for complete search history.

(56) References Cited

U.S. PATENT DOCUMENTS

| | | | |
|---|---|---|---|
| 6,502,234 B1 * | 12/2002 | Gauthier et al. | 717/107 |
| 6,574,791 B1 * | 6/2003 | Gauthier | G06F 9/4446 717/107 |
| 7,290,215 B2 * | 10/2007 | Bybee | G06F 9/4446 715/744 |
| 7,356,773 B1 | 4/2008 | Barraclough | |
| 7,409,683 B2 | 8/2008 | Krebs | |
| 7,809,584 B2 * | 10/2010 | Morag | G06F 19/322 705/2 |
| 2002/0087966 A1 | 7/2002 | Wiginton et al. | |
| 2004/0046787 A1 * | 3/2004 | Henry | G06F 8/38 715/744 |
| 2005/0066284 A1 * | 3/2005 | Ho | G06F 8/00 715/762 |
| 2005/0193001 A1 | 9/2005 | Shoham | |
| 2005/0289561 A1 * | 12/2005 | Torres | G06F 9/4443 719/328 |
| 2006/0101458 A1 * | 5/2006 | Saad | G06F 9/4446 717/174 |

(Continued)

OTHER PUBLICATIONS

Wikipedia, "Wizard (software)," retrieved from the internet <http://en.wikipedia.org/wiki/Wizard_(software)> on Jan. 11, 2011, 1 page.

(Continued)

*Primary Examiner* — Di Xiao

(57) ABSTRACT

Example methods, apparatus, and articles of manufacture to generate a wizard application are disclosed. A disclosed example method includes storing a graphical user interface input by a user for the wizard application in a file, storing a definition of an action input by the user to be performed by the wizard application in the file, and transferring the file and an engine to a user's computer, the file to be used by the engine to execute the wizard application, and the engine to, in response to an input from a user of the engine, convert the graphical user interface to at least one of a command line interface, a webpage interface, or an interface that reads user input from a file.

20 Claims, 13 Drawing Sheets

(56) References Cited

U.S. PATENT DOCUMENTS

| | | | | |
|---|---|---|---|---|
| 2009/0150773 A1* | 6/2009 | Falkner | ............... | G06F 9/44505 |
| | | | | 715/700 |
| 2010/0030878 A1* | 2/2010 | Grabowski | ....... | G06F 17/30067 |
| | | | | 709/222 |
| 2011/0173427 A1* | 7/2011 | Merkin | ................. | G06F 9/4451 |
| | | | | 713/2 |
| 2012/0117496 A1* | 5/2012 | Malhotra | .................. | G06F 8/38 |
| | | | | 715/762 |

OTHER PUBLICATIONS

JBoss, "JBoss Community," retrieved from the internet <http://www.jboss.org/jbpm> on Jan. 11, 2011, 2 pages.

JBoss, "JBoss jBPM Graphical Process Designer," retrieved from the internet <http://docs.jboss.org/jbpm/v3/gpd/> on Jan. 11, 2011, 1 page.

JBoss, "JBoss jBPM jPDL 3.2," retrieved from the internet <http://docs.jboss.org/jbpm/v3/userguide/> on Jan. 11, 2011, 6 pages.

JBoss, "JBoss jBPM—Workflow in Java," retrieved from the internet <http://docs.jboss.org/bpm/v3.2/userguide/html/> on Jan. 11, 2011, 7 pages.

JBoss, "JBoss jBPM Overview," retrieved from the internet <http://wiki.eclipse.org/images/b/be/Jbpm.overview.jwt.kickoff.pdf> on Jan. 11, 2011, 21 pages.

\* cited by examiner

FIG. 5

```xml
<?xml version="1.0" encoding="UTF-8"?>
<root-container height="1684" width="1225">
  <node height="36" name="start1" width="132" x="272" y="16">   ← 1002
    <edge>
      <label x="5" y="-10"/>   ← XXX
    </edge>
  </node>
  <node height="36" name="Welcome" width="132" x="272" y="114">
    <edge>
      <label x="5" y="-10"/>
    </edge>
  </node>
  <node height="36" name="decision-DB" width="132" x="273" y="186">
    <edge>
      <label x="5" y="-10"/>
      <bendpoint h1="50" h2="50" w1="0" w2="0"/>
      <bendpoint h1="86" h2="86" w1="0" w2="0"/>
      <bendpoint h1="118" h2="118" w1="0" w2="0"/>
      <bendpoint h1="154" h2="154" w1="0" w2="0"/>
      <bendpoint h1="50" h2="50" w1="0" w2="0"/>
      <bendpoint h1="86" h2="86" w1="0" w2="0"/>
      <bendpoint h1="118" h2="118" w1="0" w2="0"/>
      <bendpoint h1="154" h2="154" w1="0" w2="0"/>
    </edge>
    <edge>
      <label x="5" y="-10"/>
    </edge>
  </node>
  <node height="36" name="DB-connection" width="132" x="180" y="288">
    <edge>
      <label x="5" y="-10"/>
    </edge>
  </node>
  <node height="36" name="decision-app-server-ports" width="132" x="272" y="356">
    <edge>
      <label x="5" y="-10"/>
      <bendpoint h1="50" h2="50" w1="0" w2="0"/>
      <bendpoint h1="86" h2="86" w1="0" w2="0"/>
      <bendpoint h1="118" h2="118" w1="0" w2="0"/>
      <bendpoint h1="154" h2="154" w1="0" w2="0"/>
      <bendpoint h1="50" h2="50" w1="0" w2="0"/>
      <bendpoint h1="86" h2="86" w1="0" w2="0"/>
      <bendpoint h1="118" h2="118" w1="0" w2="0"/>
      <bendpoint h1="154" h2="154" w1="0" w2="0"/>
    </edge>
```

FIG. 10

```
<?xml version="1.0" encoding="UTF-8"?>
<application>
    ...
        <variables>                                    ← 1102
            <string id="CHP.progress"></string>
            <string id="CHP.runningTask"></string>
            <object id="vendorArray"></object>
    ...
            <list id="protocols">
                <string>HTTP</string>
                <string>HTTPS</string>
            </list>
        </variables>
        <services>                                     ← 1104
            <javaMethod id="getVendors"
class="com.hp.cnc.wizards.postinstall.DbConfiguration" method="getVendors"
returnType="Object"></javaMethod>
            <javaMethod id="convert-string-array-2-list"
class="com.hp.chp.engine.common.util.StringUtil" method="convertStringArray2List"
returnType="Object">
                <parameterType sequence="1" type="Object"></parameterType>
            </javaMethod>
    ...
        </services>                                    ← 1106
        <flow name="processdefinition">
            <start name="start1">
                <transition to="Retrieve-all-default-value" id="to initiating action"></transition>
            </start>
            <dialogNode name="Welcome">
                <ui title="Welcome" navigation="Welcome">
                    <formImport fileLocation="../form/welcome.xml"></formImport>
                    <buttons>
                        <button text="Next" sequence="0" hotKey="x"><linkToTransition transition="to decision-DB"></linkToTransition></button>
                    </buttons>
                    <systemButtons>
                        <systemButton sequence="2" type="cancel"><systemAction type="cancel"></systemAction></systemButton>
                    </systemButtons>
                </ui>
                <transition to="decision-DB" id="to decision-DB"></transition>
            </dialogNode>
    ...
        </flow>
</application>
```

FIG. 11

METHODS AND APPARATUS TO GENERATE A WIZARD APPLICATION

BACKGROUND

Wizard applications allow computer users and administrators to perform one or more computing tasks via a sequence of dialog boxes. The dialog boxes guide the user through the performance of a series of tasks in a sequence. The wizard application can present simplified interfaces and present prompts requesting several pieces of information and then perform more complex tasks based on the input. For example, a wizard application can guide a user through the installation of another application by presenting dialogs requesting a location for files of the application, requesting specification of particular components to be installed for the application, presenting system requirements and/or settings needed for the application etc. The received information can be utilized to perform the tasks specified for the wizard application without the need for the user to understand the tasks and how to interface with the tasks. In other words, the wizard application can provide a simplified frontend to enable complex tasks to be performed on a computer.

BRIEF DESCRIPTION OF THE DRAWINGS

FIG. 5 illustrates an example console user interface of a wizard application.

FIG. 10 illustrates a portion of an example XML file defining the graphical layout of the process.

FIG. 11 illustrates a portion of an example XML file defining operations of the process.

DETAILED DESCRIPTION

Many current approaches to developing wizard applications have significant drawbacks. For example, different teams within a single business often duplicate efforts when each team develops their own wizard framework and develops processes that cannot be reused in other teams. Such implementations often lack a common user experience because wizards use different user interfaces and styles. Furthermore, wizards must be designed for a particular user interface (e.g., graphical user interface, command line interface, etc.). Updates and revisions to the installation wizard sometimes involve significant reworking of the wizard.

Example methods, apparatus, and articles of manufacture disclosed herein can be used to develop wizard applications. In some examples, the wizard application is defined by an extensible markup language (XML) designed language called Wizard Application Design Language (WADL). In some examples, the wizard application is described in terms of a user interface, a process, and the services or actions performed during the process. Some implementations include a Graphical Wizard Application Design Tool (GWADT) that allows users to develop a wizard by dragging and dropping elements for a user interface and elements of the process of the wizard. In some examples, a Wizard Application Design Language Engine (WADL Engine) processes generated XML definition files and provides a wizard application with a graphical user interface requested by a user (e.g., application graphical user interface, webpage interface, command line interface, silent install interface, etc.). The engine performs the process defined for the wizard application based on user input. When the WADL engine is implemented in a cross-platform design (e.g., JAVA) it can be run on multiple platforms. Efficiencies in wizard application creation and editing are gained by utilizing a uniform wizard application design tool that can make elements of one wizard application available for reuse in another wizard application.

Figure 1:
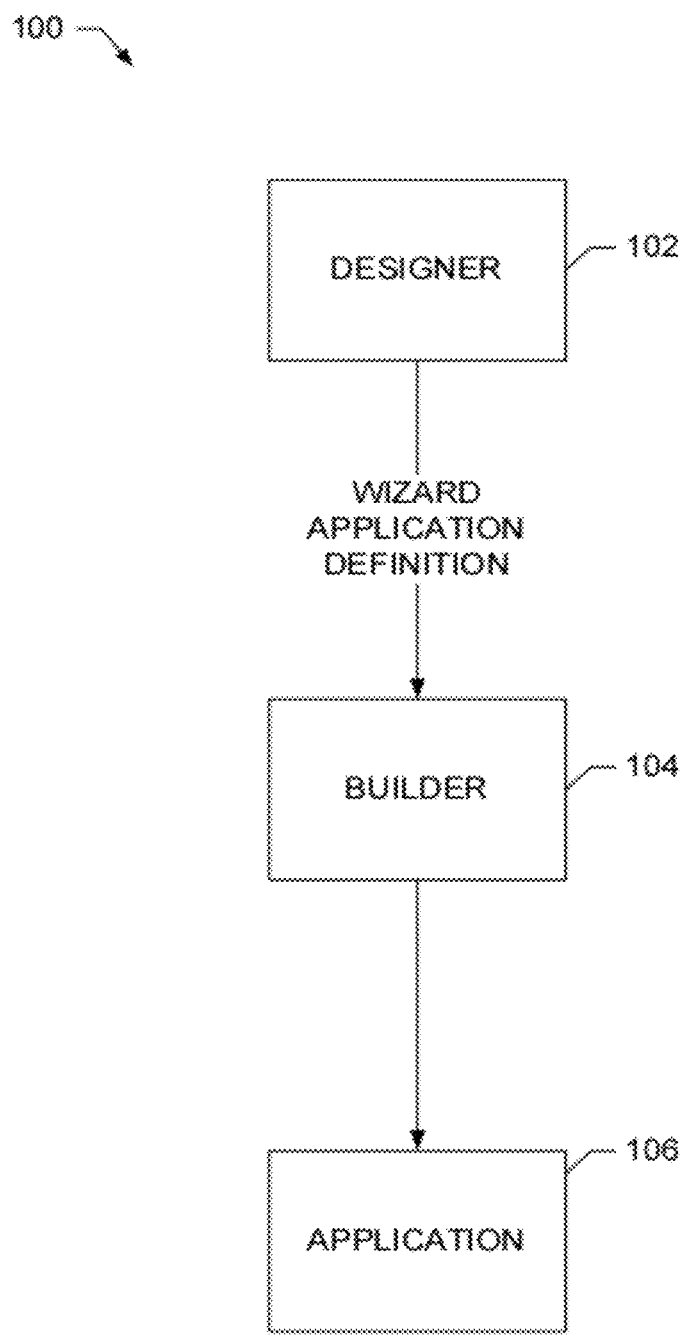
FIG. 1 is a block diagram of an example system for building a wizard application.

FIG. 1 is a block diagram of an example system 100 of FIG. 1 for building a wizard application. The example system 100 includes a designer 102, a builder 104, and an application 106. As described in further detail below, the example designer 102 provides an interface for a user of the system 100 to design a user interface and wizard application process. The example builder 104 of FIG. 1 receives the design from the designer 102 and generates the application 106. In the illustrated example, the designer 102 and builder 104 are operated on one processor platform to generate the application 106. The application 106 is thereafter transferred to another processor platform on which it is run to perform the wizard application process (e.g., to install another application). Alternatively, any other arrangement of the elements may be used.

Figure 2:
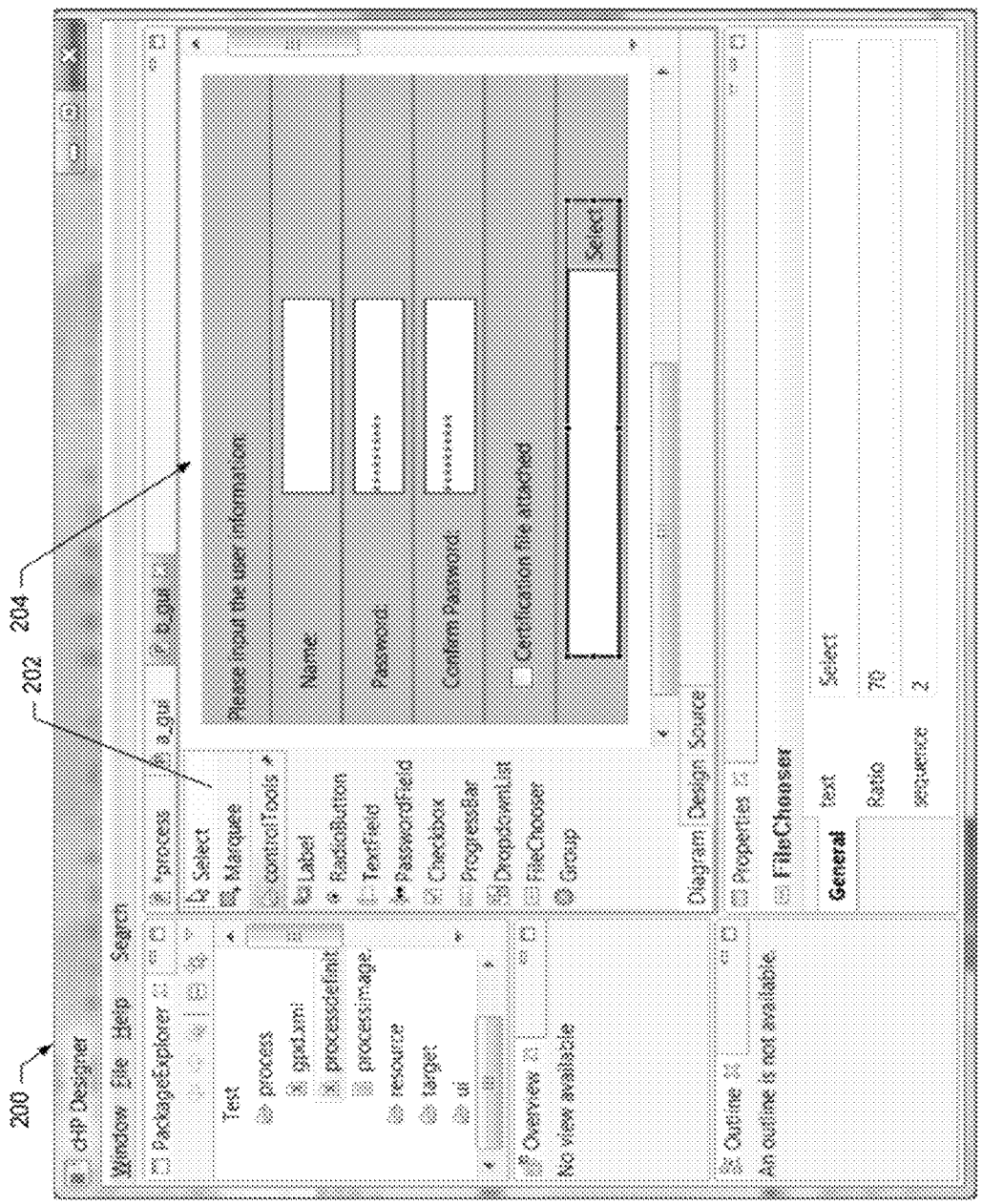
FIG. 2 illustrates an example graphical user interface for designing a user interface for a wizard application.

The designer 102 of the illustrated example provides two user interfaces. The first user interface is a graphical user interface that allows a user to design a user interface for the wizard application. An example graphical user interface 200 for designing the user interface for the wizard application is illustrated in FIG. 2. According to the illustrated example, the graphical user interface 200 provides a toolbox 202 from which a user may select user interface elements to be dragged and dropped onto a desired place on the palette 204. The toolbox 202 of the illustrated example includes a label element, a radio button element, a text field element, a password field element, a checkbox element, a progress bar element, a drop-down list element, a file chooser element, and a group element. Other examples may include some or all of the elements and/or any other elements. Other example designers provide different interfaces for users. For example, users may input text instructions indicating where a user interface element should be placed, may select elements that are automatically added to a palette, etc.

Figure 3:
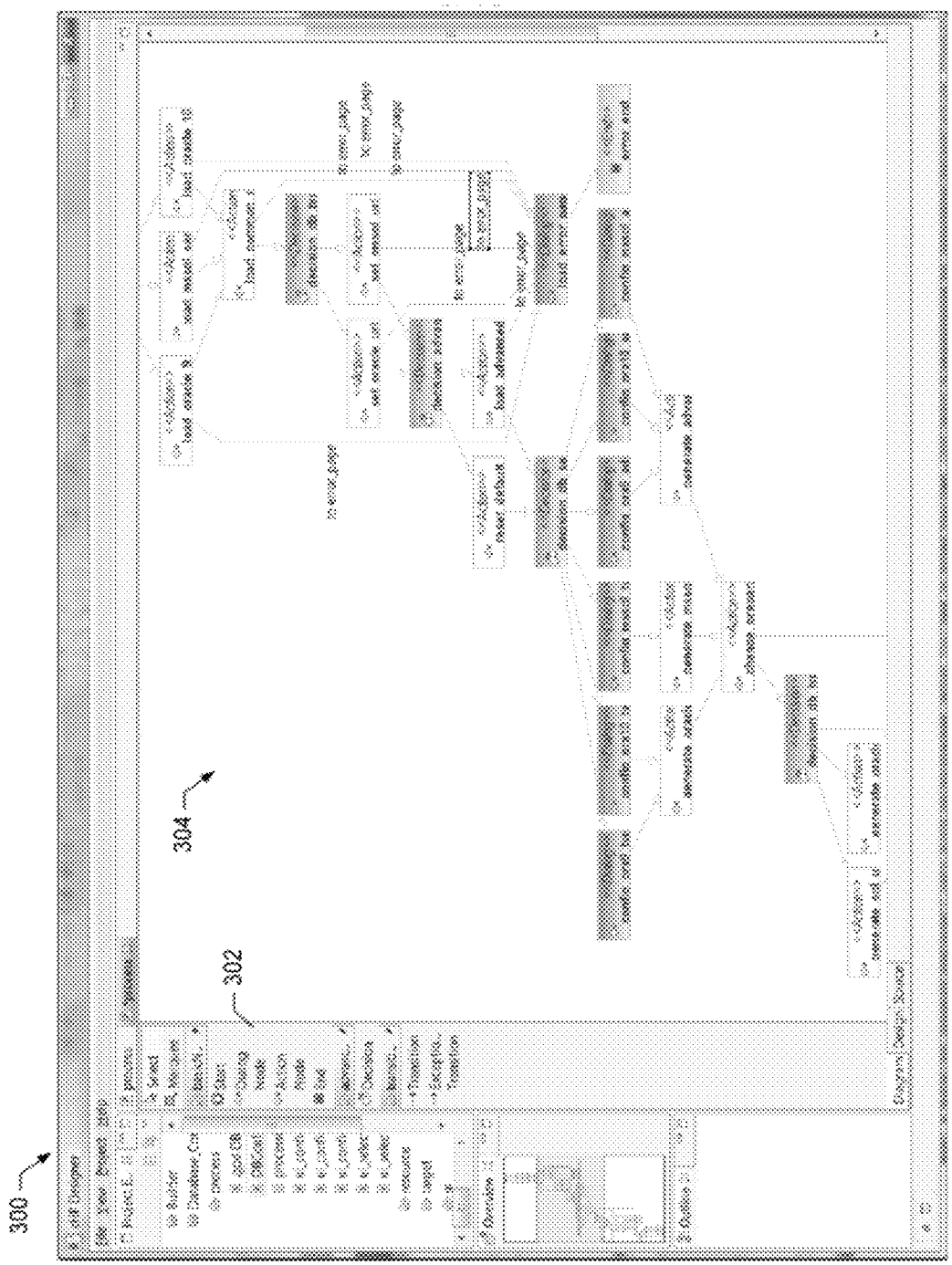
FIG. 3 illustrates an example graphical user interface for inputting a process to be utilized by a wizard application.

The second user interface provided by the example designer 102 of FIG. 1 is a graphical user interface that allows a user to specify a process to be utilized by the wizard application. An example graphical user interface 300 for inputting the process to be utilized by the wizard application is illustrated in FIG. 3. According to the illustrated example, the graphical user interface 300 provides a toolbox 302 from which a user may select process elements to be dragged and dropped onto a desired place on the palette 304. Process elements are actions to be performed by the wizard application such as, for example, displaying a prompt to the user, loading a file, loading a setting, storing a file, establishing a setting, etc. The toolbox 302 includes process transition elements for allowing the user to interconnect the process elements to create the workflow for the wizard application. For example, a transition element may be illustrated as an edge or line that interconnects illustrations of two process elements.

Figure 8:
FIG. 8 illustrates a portion of an example XML file that can be processed by the engine of FIG. 1 to generate one or more of the user interfaces of FIGS. 4-7.

The designer 102 of the illustrated example stores the user interface and process layout designed by the user for the wizard application in one or more files. According to the illustrated example, the user interface and/or the process are stored in several XML files. FIGS. 8, 10, and 11 illustrate example XML files for storing the user interface and the process. The user interface and/or process may alternatively be stored in any type and/or number of file(s) or datastore(s).

The builder 104 of the illustrated example receives the files defining the user interface and the process for the wizard application from the designer 102 and generates the application 106 that implements the wizard application. The example builder 104 combines the multiple XML files to generate a single archive (e.g., a JAVA archive (JAR) file) of XML files that can be parsed by the application 106 and bundles the single archive file with the application 106 so that the application 106 can be transferred to a computer on which the wizard application is run. For example, the builder 104 may combine an engine and the XML files in an archive, bundle, zip file, etc. Alternatively, the builder 104 may store the archive of XML files in a location that can be accessed by the engine of the application 106 such as, for example, a network storage location, a portable storage location, a hard drive, a system memory, etc.

When combining the multiple XML files into an archive file, the builder 104 of the illustrated example translates the XML files for easier processing by the engine. For example, the builder 104 may remove information from the XML files that details the graphical layout of the process because the graphical layout of the process does not affect the operation of the application 106 of the wizard application. The example builder 104 also includes support files such as libraries in the application 106. For example, the builder 104 may add library(ies) for graphical user interface(s) (e.g., a JAVA Swing library, webpage graphical element libraries, etc.), library(ies) for reading file formats (e.g., a library for reading XML files), library(ies) for configuring properties and settings of an application, library(ies) for performing text validation, library(ies) for reading and writing files and directories, library(ies) for retrieving computer system properties, library(ies) for verifying port numbers and usage, library(ies) for checking software versions (e.g., checking the version of a JAVA environment), etc.

The application 106 of the illustrated example includes the engine and support files such as the XML file describing the user interface and process of the wizard application and any libraries used by the engine. The application 106 of the illustrated example is bundled into a single executable file that can be transferred to a computer on which it is to be executed. The application 106 may also include or have access to additional files that may be processed. For example, when the wizard application is an installation wizard, the application 106 may include or have access to file(s) for an application that is to be installed (e.g., an executable and support file for an application to be installed).

The engine of the application 106 processes the XML file(s) to generate a user interface for operating the wizard application. The example application 106 includes several user interface renderers to enable a user to select among an application graphical user interface, a webpage graphical user interface, a console graphical user interface, and/or or a silent interface.

Figure 4:
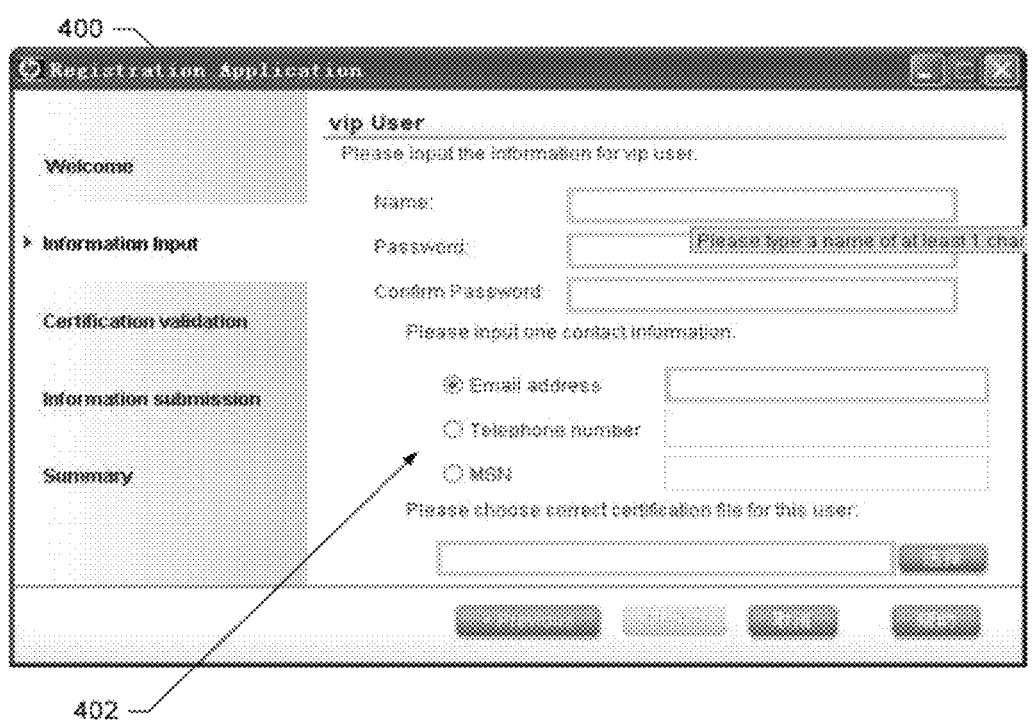
FIG. 4 illustrates an example application graphical user interface of a wizard application.
Figure 5:
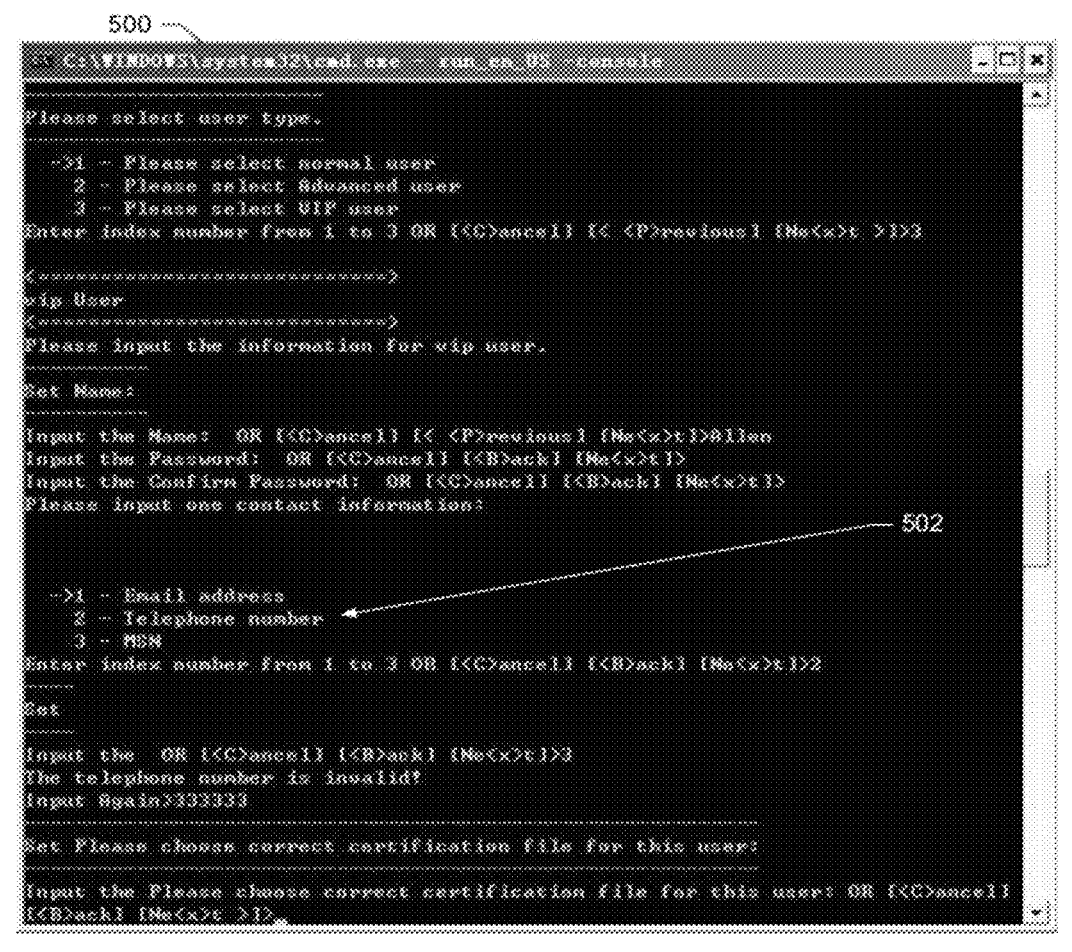
Figure 6:
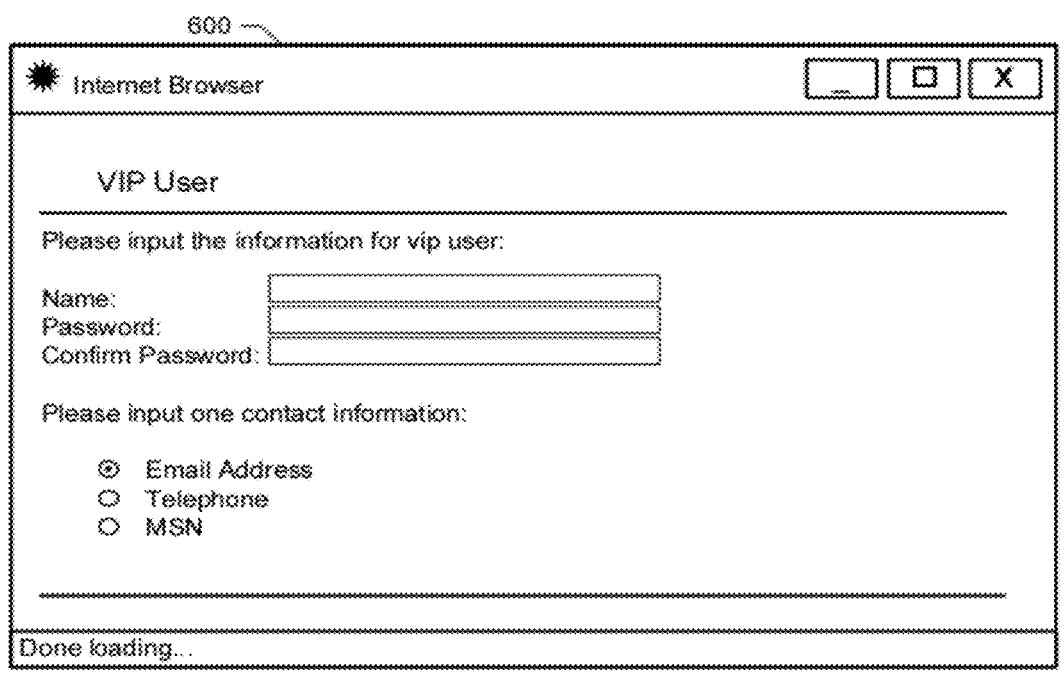
FIG. 6 illustrates an example webpage graphical user interface of a wizard application.
Figure 7:
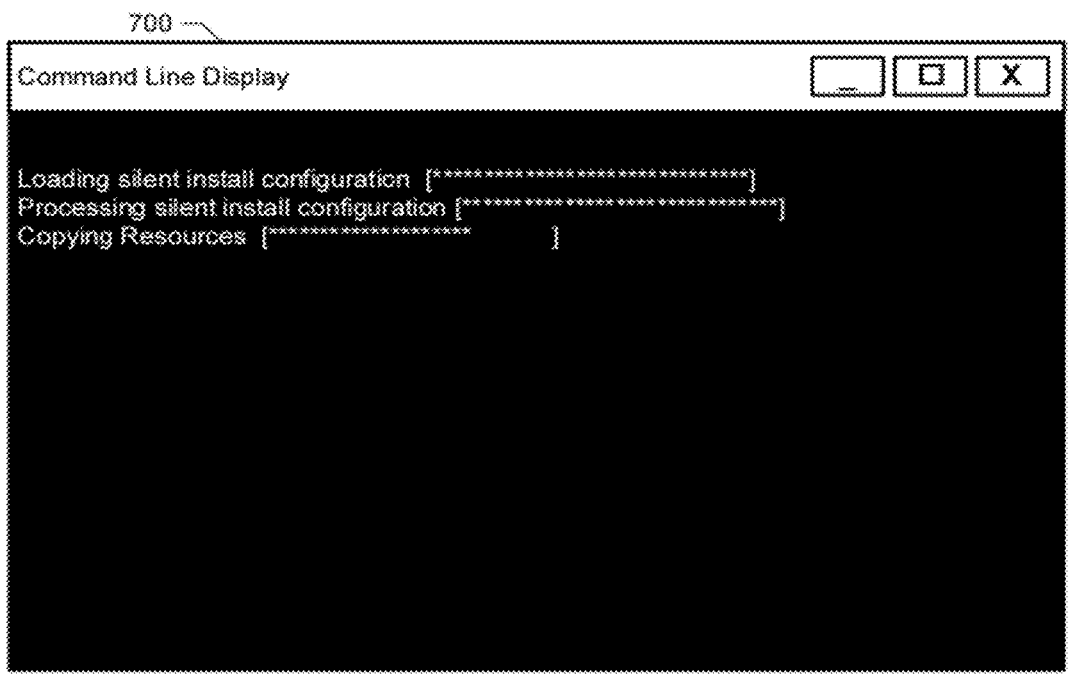
FIG. 7 illustrates an example display providing a silent interface status display of a wizard application.

An application graphical user interface displays a graphical user interface application in the user's operating system (e.g., using a Swing renderer). An example application graphical user interface 400 illustrated in FIG. 4 includes an example input 402 for a user to input contact information. The console user interface provides a text-based interface for a command line interface. An example console user interface 500 illustrated in FIG. 5 includes an example input 502 for a user to input contact information at a command line. The webpage graphical user interface presents a graphical user interface in a web browser (e.g., an HTML user interface, a Flash user interface, a JAVA applet user interface, etc.). An example webpage graphical user interface 600 illustrated in FIG. 6 includes an example input 602 for a user to input contact information. The silent interface reads user input settings from one or more files specified by the user so that the wizard application can execute without prompting the user or providing few or no prompts (e.g., displaying status). An example display providing a silent interface status display is illustrated in FIG. 7.

By including multiple renders in the application 106, a single XML graphical user interface definition included in the application 106 can be processed by the application 106 to implement any user interface requested by the user running the wizard application. According to the illustrated example, the application 106 receives a parameter from the user indicative of the desired user interface type at the time of execution. For example, when the wizard application is executed from a command line the parameter may be specified as the command line switch "-console".

FIG. 8 illustrates a portion of an example XML file that can be processed by the builder 104 to generate an XML file to be processed by the application 106 to generate the user interfaces of FIGS. 4-7. The XML file of the illustrated example has been condensed for space to show the portions defining the example inputs 402, 502, 602, and 702. The example XML file includes a widget portion 802 defining the user interface elements of the interface. The widget portion 802 includes a definition of several text boxes, several labels, and a radio button group. The example XML file also includes a table layout portion 804 that defines the layout of the user interface elements in table cells containing the user interface elements in several rows.

Figure 9:
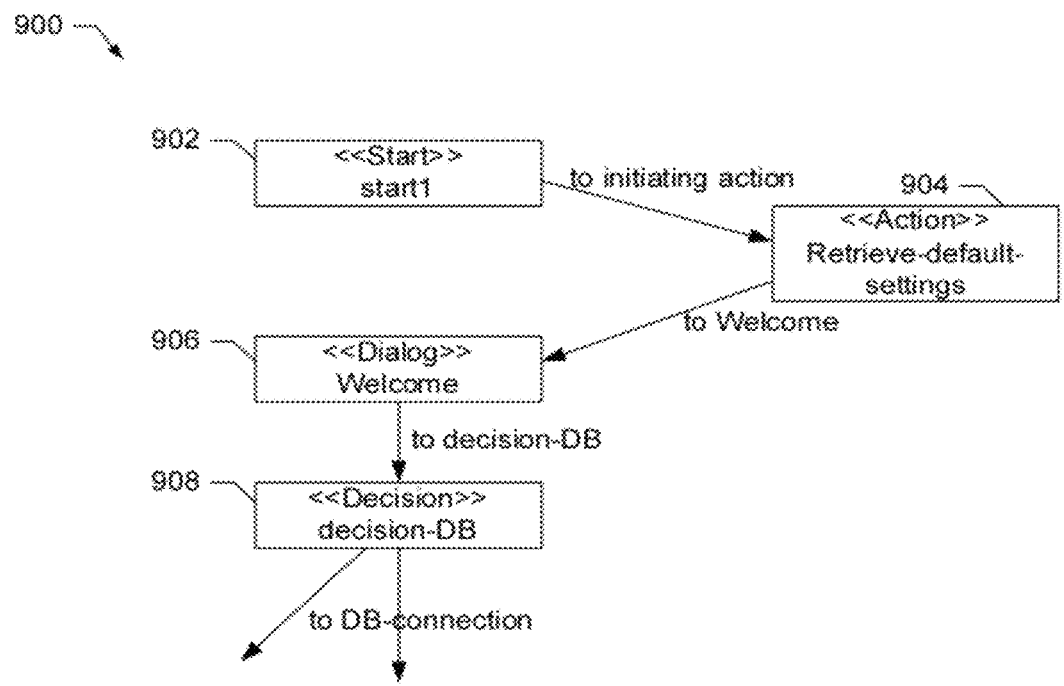
FIG. 9 illustrates an example process layout as designed by a user of the designer of FIG. 1.

FIG. 9 illustrates an example process layout 900 as designed by a user of the designer 102 of FIG. 1. The example process layout 900 includes a start element 902, an action 904, a dialog 906, and a decision 908. The example start element 902 indicates where the process starts and transitions to the action 904. The action 904 performs a specified action when reached in the workflow. According to the illustrated example, the action 904 transitions to the dialog 906 after performing the specified action. The dialog 906 presents a dialog box to the user that may include a user interface element. The process transitions from the dialog 906 to the decision 908. The decision 908 branches the workflow of the process based on a specified input. For example, the decision 908 could branch based on an input provided by the dialog 906, a setting accessed by the decision 908, or any other information.

FIG. 10 illustrates a portion of an example XML file 1000 defining the graphical layout of the process 900. For example, the XML file includes a node element 1002 indicating that the start element 902 has a width of 132 pixels and is placed on the canvas at x-coordinate 272 and y-coordinate 16.

FIG. 11 illustrates a portion of an example XML file defining operations of the process 900. For example, the XML file 1100 includes a variables section 1102, a services section 1104, and a workflow section 1106. The variables section 1102 defines variables (e.g., strings, objects, lists, etc.). The services section 1104 defines operations (e.g., JAVA methods) to be performed in the process 900. The workflow portion lists the node elements of the process and specifies the operations performed by the node elements and transitions between node elements.

Figure 12:
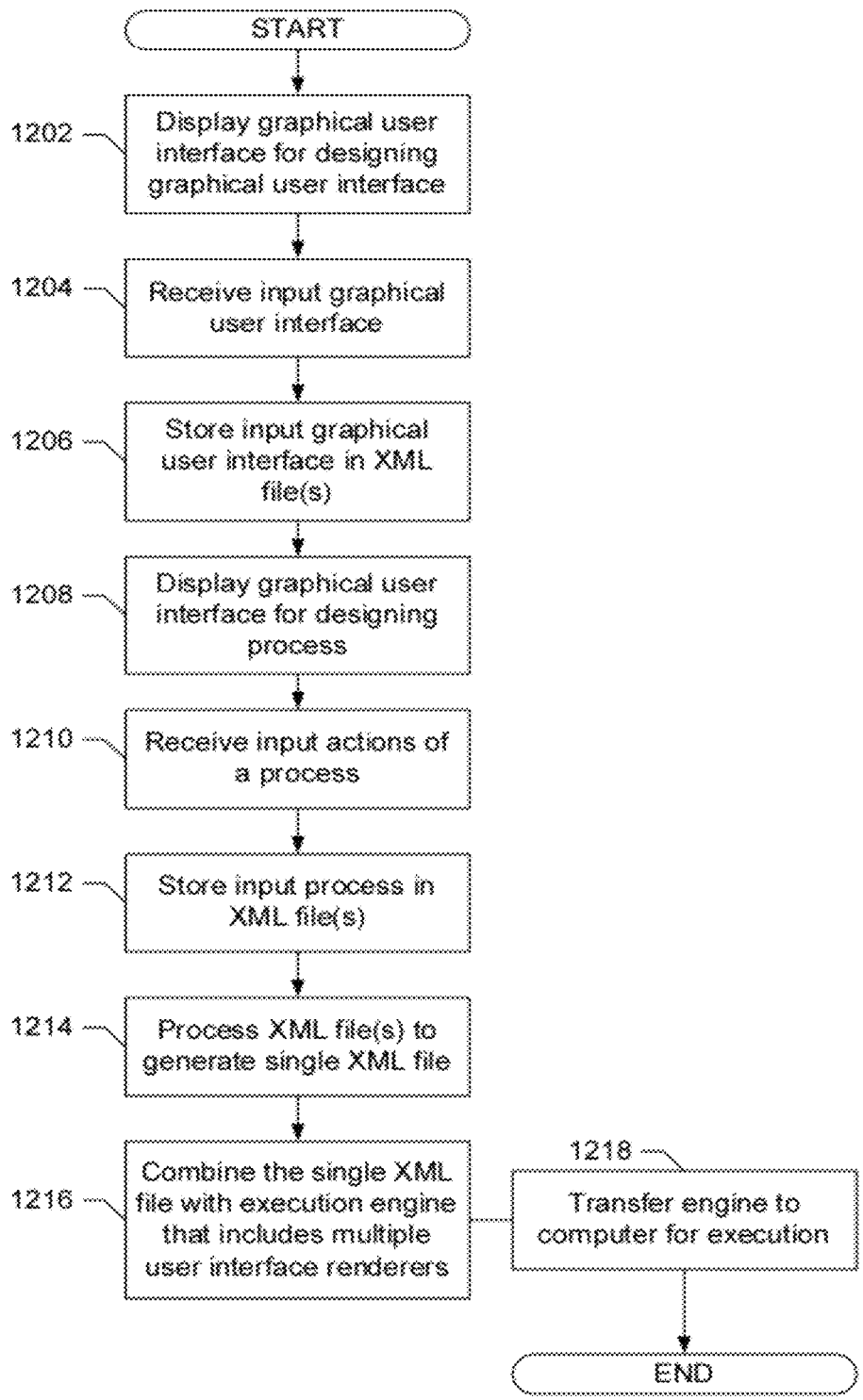
FIG. 12 is a flow diagram representative of example machine readable instructions that may be executed to implement the example system of FIG. 1.

FIG. 12 depicts a flow diagram representative of example machine readable instructions for implementing the example system 100 of FIG. 1. In this example, the machine readable instructions comprise a program for execution by a processor such as the processor 1312 shown in the example computer 1300 discussed below in connection with FIG. 13. The program may be embodied in software stored on a computer readable medium such as a CD-ROM, a floppy disk, a hard drive, a digital versatile disk (DVD), or a memory associated with the processor 1312, but the entire program and/or parts thereof could alternatively be executed by a device other than the processor 1312 and/or embodied in firmware or dedicated hardware. Further, although the example program is described with reference to the flowchart illustrated in FIG. 12, many other methods of implementing the example system 100 may alternatively be used. For example, the order of execution of the blocks may be changed, and/or some of the blocks described may be changed, eliminated, or combined.

As mentioned above, the example process of FIG. 12 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 12 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Now turning in detail to FIG. 12, initially, the designer 102 (FIG. 1) displays a graphical user interface for designing a graphical user interface for the wizard application (block 1202). The designer 102 receives an input graphical user interface definition from a user (block 1204). The designer 102 stores the definition of the graphical user interface in one or more XML file(s) (block 1206).

The designer 102 displays a graphical user interface for designing a process for the wizard application (block 1208). The designer 102 receives an input process definition from the user (block 1210). The designer 102 then stores the definition in the one or more XML file(s) (block 1212).

The builder 104 (FIG. 1) processes the one or more XML file(s) to generate a single XML file (block 1214). As described above, processing the one or more XML file(s) may include removing information unnecessary for implementing the designed wizard application user interface and process. The builder 104 combines the single XML file with an execution engine that includes multiple user interface renderers to generate the application 106 (FIG. 1) (block 1216). According to the illustrated example, the single XML file includes a single definition of the graphical user interface for the wizard application that can be processed by any of the multiple user interface renderers to provide a desired user interface for the wizard application. The builder then transmits the application 106 to a computer for execution of the wizard application (block 1218).

Figure 13:
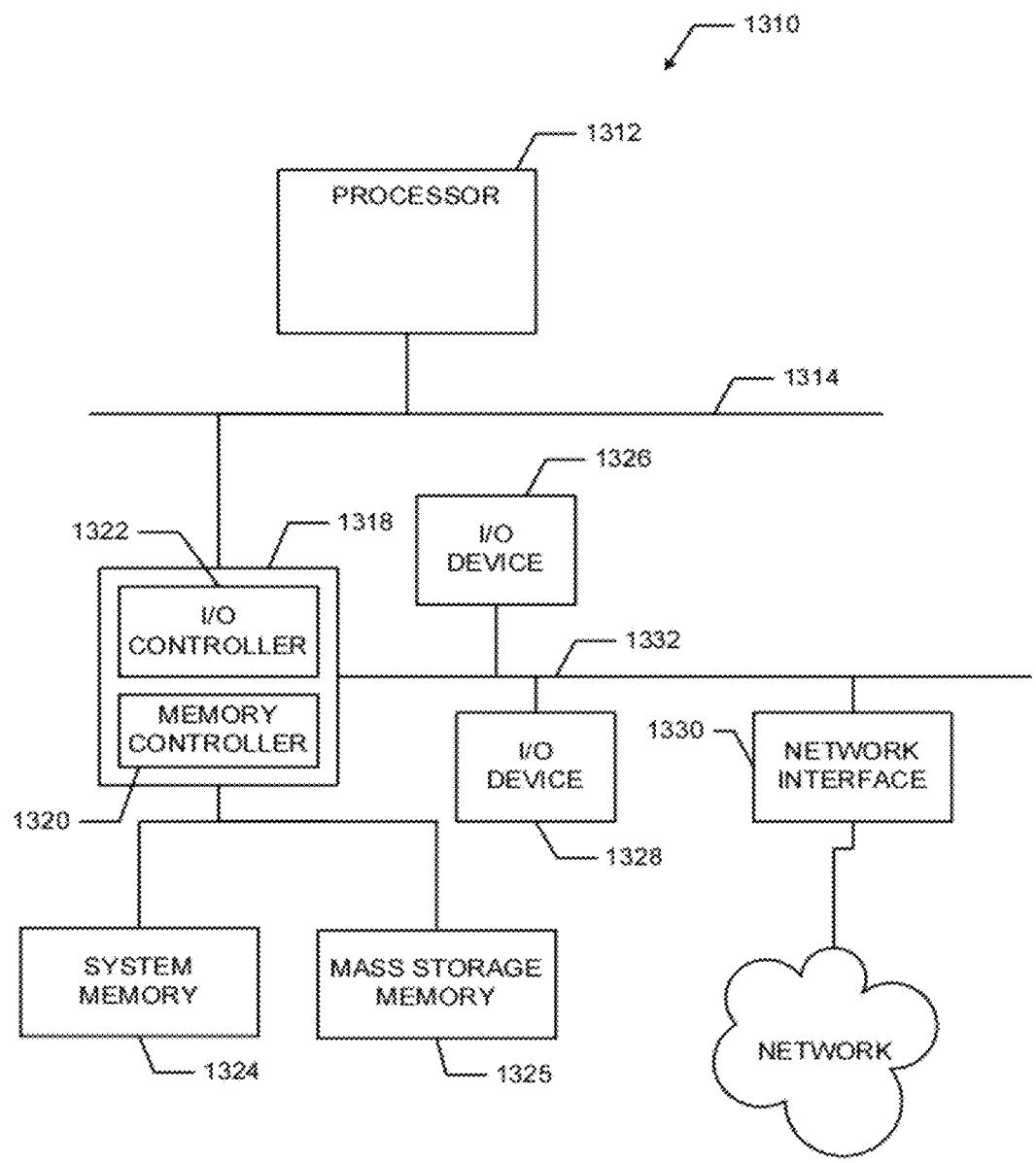
FIG. 13 is an example processor system that can be used to execute the example instructions of FIG. 12 to implement the example system of FIG. 1.

FIG. 13 is a block diagram of an example processor system 1310 that may be used to implement the example methods, apparatus, and articles of manufacture described herein. For example, the example processor system 1310 may be used to implement the designer 102, the builder 104, and/or the application 106 of FIG. 1 to implement the example system 100 and/or the techniques and features associated therewith as described above in connection with FIGS. 1-12.

As shown in FIG. 13, the processor system 1310 includes a processor 1312 that is coupled to an interconnection bus 1314. The processor 1312 may be any suitable processor, processing unit, or microprocessor. The system 1310 may be a multi-processor system and, thus, may include one or more additional processors that are identical or similar to the processor 1312 and that are communicatively coupled to the interconnection bus 1314.

The processor 1312 of FIG. 13 is coupled to a chipset 1318, which includes a memory controller 1320 and an input/output (I/O) controller 1322. A chipset provides I/O and memory management functions as well as a plurality of general purpose and/or special purpose registers, timers, etc. that are accessible or used by one or more processors coupled to the chipset 1318. The memory controller 1320 performs functions that enable the processor 1312 (or processors if there are multiple processors) to access a system memory 1324 and a mass storage memory 1325.

In general, the system memory 1324 may include any desired type of volatile and/or non-volatile memory such as, for example, static random access memory (SRAM), dynamic random access memory (DRAM), flash memory, read-only memory (ROM), etc. The mass storage memory 1325 may include any desired type of mass storage device including hard disk drives, optical drives, tape storage devices, etc.

The I/O controller 1322 performs functions that enable the processor 1312 to communicate with peripheral input/output (I/O) devices 1326 and 1328 and a network interface 1330 via an I/O bus 1332. The I/O devices 1326 and 1328 may be any desired type of I/O device such as, for example, a keyboard, a video display or monitor, a mouse, etc. The network interface 1330 may be, for example, an Ethernet device, an asynchronous transfer mode (ATM) device, an 802.11 device, a digital subscriber line (DSL) modem, a cable modem, a cellular modem, etc. that enables the processor system 1310 to communicate with another processor system.

While the memory controller 1320 and the I/O controller 1322 are depicted in FIG. 13 as separate functional blocks within the chipset 1318, the functions performed by these blocks may be integrated within a single semiconductor circuit or may be implemented using two or more separate integrated circuits.

Although certain methods, apparatus, and articles of manufacture have been described herein, the scope of coverage of this patent is not limited thereto. To the contrary, this patent covers all methods, apparatus, and articles of manufacture fairly falling within the scope of the claims either literally or under the doctrine of equivalents.

What is claimed is:

1. A method to generate a wizard application, the method comprising:
    storing, by executing a computer readable instruction with a processor, a first definition of a graphical user interface for the wizard application in a file, the first definition identifying a type and a name of an element to be rendered in the graphical user interface, the first definition further identifying a position of the element relative to other user interface elements of the graphical user interface;
    transferring, by executing a computer readable instruction with the processor, the file and an engine to a computer, the engine including a first user interface renderer to render the graphical user interface as a first type to present the element from the first definition and a second user interface renderer to render the graphical user interface as a second type to present the element from the first definition, wherein the engine is to render the graphical user interface as the first type to present the element from the first definition when the first user interface renderer is selected by a user input and to, render the graphical user interface as the second type to present the element from the first definition when the second user interface renderer is selected by the user input.

2. A method as defined in claim 1, wherein the first type of the graphical user interface is a webpage graphical user interface, and rendering the graphical user interface with the first user interface renderer includes rendering the wizard application in a webpage interface corresponding to a webpage user interface element from the element indicated in the file.

3. A method as defined in claim 2, wherein the webpage user interface element is a hypertext markup language text box and the element is a software text box.

4. A method as defined in claim 1, wherein the first type of the graphical user interface is a console graphical user interface, and rendering the graphical user interface with the first user interface renderer includes rendering the wizard application in a console interface corresponding to a command line user interface element from the element indicated in the file.

5. A method as defined in claim 4, wherein the command line user interface element is a command line prompt that receives text user input and the element is a software text box.

6. A method as defined in claim 1, wherein the first type of the graphical user interface is a silent user interface, and further including reading the file to determine input settings for a silent user interface element indicated in the file.

7. A method as defined in claim 1, further including receiving at least one of the type of graphical user interface or the second definition via a second graphical user interface.

8. A method as defined in claim 1, further including compiling the engine and the file to generate an executable.

9. A method as defined in claim 1, wherein the first type of the graphical user interface is a webpage graphical user interface, the second type of the graphical user interface is an application graphical user interface, and the engine further includes a third user interface renderer to render a third type of graphical user interface that is a command line interface.

10. A method as defined in claim 1, wherein the file is an extensible markup language (XML) file that is bundled with the engine and the engine processes the XML file to generate the graphical user interface for the wizard application.

11. A method as defined in claim 1, further including:
    presenting a designer graphical user interface to design a process for the wizard including a displayed representation of the action for selection by a user, wherein the designer graphical user interface facilitates connecting a displayed line between a first action and a second action to indicate that the wizard is to perform the second action after performing the first action; and
    converting the process to the second definition stored in the file.

12. A tangible computer readable medium comprising instructions that, when executed, cause a machine to at least:
    determine a first definition of a graphical user interface for a wizard application from a file, the first definition identifying a type and a name of an element to be rendered in the graphical user interface, the first definition further identifying a position of the element relative to other user interface elements of the graphical user interface;
    determine a second definition of an action to be performed by the wizard application from the file;
    execute an engine including a first user interface renderer to render the graphical user interface as a first type to present the element from the first definition or a second user interface renderer to render the graphical user interface as a second type to present the element from the first definition;
    select (a) the first user interface renderer to render the first type based on the first definition and on a user input indicating a selection of the first type or (b) the second user interface renderer to render the second type based on the definition and on the user input indicating a selection of the second type;
    render the graphical user interface as the first type to present the element from the first definition when the first user interface renderer is selected or render the graphical user interface as the second type to present the element from the first definition when the second user interface renderer is selected; and
    execute the wizard application using the second definition of the action in the file.

13. A tangible computer readable medium as defined in claim 12, wherein the file stores a third definition of a graphical representation of a process for the wizard application, the process including the action.

14. A tangible computer readable medium as defined in claim 13, wherein the third definition of the graphical representation of the process identifies a first node representative of the action and a second node representative of another action.

15. A tangible computer readable medium as defined in claim 14, wherein the third definition of the graphical representation of the process identifies an edge that connects the first node to the second node.

16. A tangible computer readable medium as defined in claim 12, wherein the first type of the graphical user interface is a webpage graphical user interface, the second type of the graphical user interface is an application graphical user interface, and the engine further includes a third user interface renderer to render a third type of graphical user interface that is a command line interface.

17. An apparatus to generate a wizard application, the apparatus comprising:
a builder to receive a file including (1) a first definition of a graphical user interface for the wizard application, the first definition identifying a type and a name of an element to be rendered in the graphical user interface, the first definition further identifying a position of the element relative to other user interface elements of the graphical user interface, and (2) a second definition of a process to be performed by the wizard application, the builder to combine the file with an engine; and
the engine including a first user interface renderer to render the graphical user interface as a first type to present the element from the first definition and a second user interface renderer to render the graphical user interface as a second type to present the element from the first definition, the engine to:
select either (a) the first user interface renderer to render the first type based on the first definition and on a user input indicating a selection of the first type or (b) the second user interface renderer to render the second type of the graphical user interface based on the first definition and on the user input indicating a selection of the second type;
render the graphical user interface as the first type to present the element from the first definition when the first user interface renderer is selected, render the graphical user interface as the second type to present the element from the first definition when the second user interface renderer is selected; and
execute the wizard application using the second definition of the process in the file, at least one of the builder or the engine implemented via a logic circuit included in the apparatus.

18. An apparatus as defined in claim 17, further including a designer to display a designer graphical user interface to design the graphical user interface for the wizard application.

19. An apparatus as defined in claim 17, further including a designer to display a designer graphical user interface to design the process for the wizard application.

20. An apparatus as defined in claim 17, wherein the first type of the graphical user interface is a webpage graphical user interface, the second type of the graphical user interface is an application graphical user interface, and the engine further includes a third user interface renderer to render a third type of graphical user interface that is a command line interface.

* * * * *